March 5, 1957 D. RICHMAN 2,784,249

KEYED AUTOMATIC GAIN CONTROL

Filed July 21, 1950 2 Sheets-Sheet 1

INVENTOR.
DONALD RICHMAN

BY Everett A. Gartnell

ATTORNEY

March 5, 1957 D. RICHMAN 2,784,249

KEYED AUTOMATIC GAIN CONTROL

Filed July 21, 1950 2 Sheets-Sheet 2

*INVENTOR.*
DONALD RICHMAN

BY Everett A. Gartrell

ATTORNEY 2,784,249
Patented Mar. 5, 1957

2,784,249

KEYED AUTOMATIC GAIN CONTROL

Donald Richman, Flushing, N. Y., assignor to Hazeltine Research, Inc., Chicago, Ill., a corporation of Illinois Application July 21, 1950, Serial No. 176,410
6 Claims. (Cl. 178—7.3)

*General*

Figure 1:
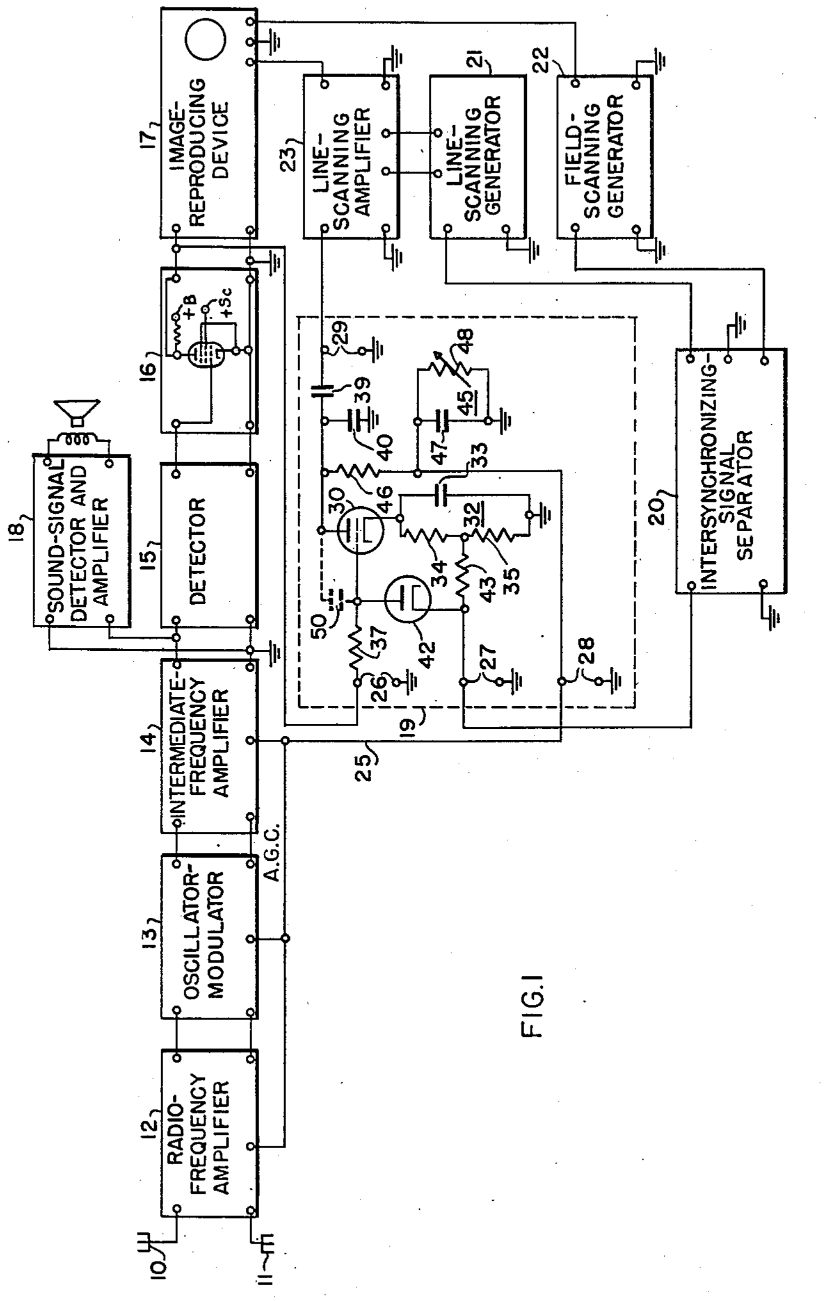

The present invention relates to automatic-control apparatus and, more particularly, to apparatus for automatically controlling an operating characteristic of television receivers. The invention is particularly useful as an automatic-gain-control apparatus for maintaining the intensity of the output signal of the main signal-translating channel of a television receiver within a relatively narrow range for a wide range of received signal intensities. Accordingly, the invention will be described in that environment.

In accordance with present television practice, there is developed and transmitted a signal which comprises a carrier wave modulated during recurring intervals or trace periods by picture components representative of the light and shade values of an image being transmitted. During retrace intervals between the trace periods, the carrier wave is modulated by synchronizing-signal components or pulses which correspond to the initiation of successive lines and fields in the scanning of the image being televised. At the receiver a beam is so deflected as to scan and illuminate a target in a series of fields of parallel lines. The picture components of the received signal are utilized to control the intensity of the scanning beam. The line-scanning and the field-scanning components are separated from the picture components and from each other and are utilized to synchronize the operation of the receiver line-scanning and field-scanning generators with the similar scanning apparatus utilized at the transmitter in developing the transmitted signal. The transmitted image is thereby reconstructed on the target of the receiver.

It is particularly desirable that a television receiver include suitable apparatus for developing a control effect automatically to control an operating characteristic thereof, such as the gain or amplification. It is desirable that this gain-control effect, usually referred to as an A. G. C. effect, be determined by the intensity of the incoming signal, that is, the intensity of the carrier-wave signal, and be substantially independent of its picture-modulation components. Furthermore, it is desirable that the automatic-gain-control apparatus exhibit a high immunity to high-amplitude random noise associated with the received television signal. Automatic-gain-control apparatus of this type is capable of developing an automatic-gain-control effect which, in turn, is effective very accurately to maintain the signal input to the various stages of the receiver within a relatively narrow range for a wide range of received signal intensities.

The so-called "keyed" automatic-gain-control systems or apparatus which have been devised have performance characteristics such that they have greatly improved immunity with respect to random or impulse noise. In general, such apparatus includes a normally nonconductive electron tube having at least three electrodes and the video-frequency signal including the line-synchronizing components and the original unidirectional components are applied to the control electrode-cathode input circuit while recurrent positive polarity gating or keying pulses of relatively high amplitude are applied to the anode circuit of the tube. These gating pulses are ordinarily derived from the output transformer associated with the line-scanning amplifier and, therefore, occur in substantially synchronous relation with the line-scanning pulses. A time-constant or integrating network responsive to the space current of the tube is effective to derive an automatic-gain-control potential during the recurring intervals in which the synchronizing pulses and the gating pulses render the tube conductive. Since the tube is conductive only for a small percentage of the time, the automatic-gain-control apparatus exhibits good immunity to random or impulse noise such as occurs in the intervals between the synchronizing pulses.

In automatic-gain-control apparatus of the type under consideration, the synchronizing-signal pulses and the gating pulses applied to the tube mentioned above never occur in exact coincidence for several reasons. Ordinarily, the gating pulses have a duration which is longer than that of the synchronizing pulses. Furthermore, the phase relations of the two types of pulses are never identical. The generation of the gating pulses is substantially independent of the synchronizing pulses since they are produced by a line-scanning oscillator and amplifier which have circuits of relatively high Q. The phase of the gating pulses with reference to the line-synchronizing pulses may vary for such reasons as oscillator drift, potential variations of the power-supply system, and adjustments by the operator of the operating frequency of the line-scanning oscillator. Since the tube in the automatic-gain-control circuit is rendered conductive by the coincidence of the line-synchronizing and the gating pulses and, as mentioned above, these pulses ordinarily have different durations, small phase changes between the aforesaid pulses may appreciably alter the duration of the conductive intervals of the tube and hence the average value of the space current drawn by the tube. This, in turn, undesirably modifies the potential developed across the integrating network and hence the value of the automatic-gain-control potential developed for application to the various stages of the television receiver. Ideally, it is desirable that the current drawn by the tube only be proportional to the amplitude of the line-synchronizing pulses applied to the control electrode-cathode circuit of the tube so that the developed automatic-gain-control potential is proportional to the intensity of the received carrier-wave signal.

It has been proposed that extremely short-duration keying pulses be employed in automatic-gain-control apparatus of the sort being considered to avoid some of the disadvantages just mentioned. Such pulses are not readily available in a television receiver and can ordinarily be attained only at a cost which is greater than is desirable. Furthermore, such short-duration pulses may make the setting of the frequency control of the line-scanning oscillator more critical.

It is an object of the invention, therefore, to produce a new and improved automatic-control apparatus which avoids one or more of the above-mentioned disadvantages and limitations of prior such apparatus.

It is another object of the invention to provide a new and improved control apparatus for automatically controlling an operating characteristic of a television receiver.

It is a further object of the invention to provide for use in a television receiver a new and improved automatic-gain-control apparatus which is extremely simple in construction yet is capable of producing a gain-control effect which varies accurately with variations in the intensity of the received carrier-wave signal.

It is a particular object of the invention to provide for use in a television receiver a new and improved keyed automatic-gain-control apparatus which derives an automatic-gain-control potential that is substantially independent of small changes in the phase between the synchronizing pulses and the gating pulses applied to the control tube thereof.

In accordance with a particular form of the invention, an automatic-gain-control apparatus for a television receiver comprises a first circuit having a primarily resistive impedance for supplying synchronizing pulses having an amplitude which may vary and a second circuit for supplying periodic pulses having a frequency related to that of the synchronizing pulses but having a phase which may vary relative thereto. The apparatus also includes an electron-discharge phase-comparison device having input electrodes connected to the first circuit, output electrodes coupled to the second circuit, a current-conductive path coupled between the output electrodes for passing current therebetween only during periods of coincidence between individual ones of the synchronizing pulses and the periodic pulses, an integrating network in the aforesaid path having a time constant at least several times that of the period of the synchronizing pulses for deriving from the aforesaid current a control effect having a value which tends to vary with the relative phases of the aforesaid pulses, and means coupled to the input electrodes for developing a bias normally maintaining the device in a nonconductive condition. The automatic-gain-control apparatus further includes a condenser which is coupled between one of the output electrodes and one of the aforesaid input electrodes and is proportioned with the aforesaid resistive impedance to constitute a differentiating circuit having a time constant much less than the interval of individual ones of the synchronizing pulses for deriving from the periodic pulses and effectively superimposing on the synchronizing pulses a control signal comprising pulses having maximum amplitude portions of substantially constant durations and of shorter durations than the synchronizing pulses to develop at the aforesaid one input electrode resultant high-amplitude pulses which overcome the aforesaid bias and effect the aforesaid passage of current only during the above-mentioned maximum amplitude portions, whereby the control effect is proportional to the average amplitude of the synchronizing pulses but is substantially independent of the variations of the relative phases of the periodic pulses and the synchronizing pulses.

For a better understanding of the present invention, together with other and further objects thereof, reference is had to the following description taken in connection with the accompanying drawings, and its scope will be pointed out in the appended claims.

Figure 3:
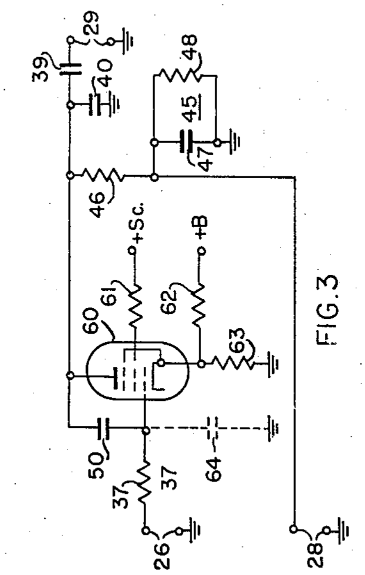
Figure 4:
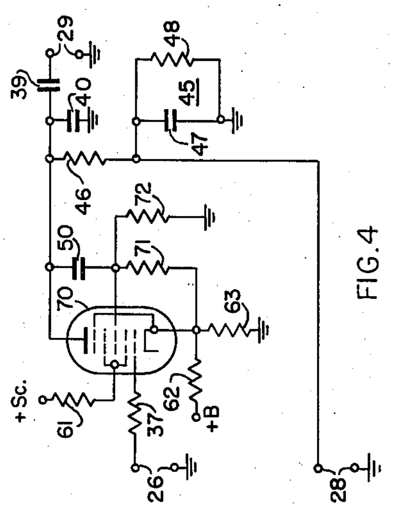
Figure 2:
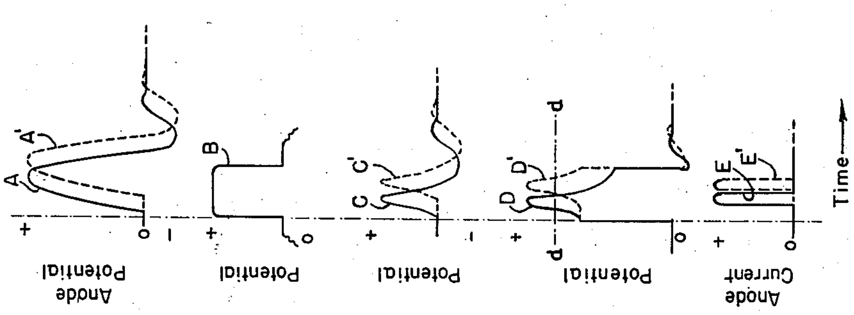

In the accompanying drawings, Fig. 1 is a circuit diagram, partly schematic, of a complete television receiver including an automatic-control apparatus in accordance with a particular form of the present invention; Fig. 2 is a graph utilized in explaining the operation of the control apparatus of Fig. 1; Fig. 3 is a circuit diagram of a modified form of the control apparatus represented in Fig. 1; and Fig. 4 is a circuit diagram of another form of a control apparatus in accordance with the present invention.

*General description of Fig. 1 Receiver*

Referring now more particularly to Fig. 1 of the drawings, the television receiver there represented comprises a receiver of the superheterodyne type including an antenna system 10, 11 coupled to a radio-frequency amplifier 12 of one or more stages. There are coupled to the latter unit in cascade, in the order named, an oscillator-modulator 13, an intermediate-frequency amplifier 14 of one or more stages, a detector 15, a direct-current video-frequency amplifier 16 of one or more stages (for simplicity represented as a single stage), and a cathode-ray image-reproducing device 17 of conventional construction provided with the usual line-frequency and field-frequency scanning coils (not shown) for deflecting the cathode-ray beam in two directions normal to each other. Connected to the output terminals of the intermediate-frequency amplifier 14 is a conventional sound-signal detector and amplifier 18 which comprises the usual frequency detector, amplifiers, and sound-reproducing device.

An output circuit of the video-frequency amplifier 16 is coupled to an input circuit including input terminals 26, 26 of a control apparatus 19, and an output circuit of the latter including output terminals 27, 27 is coupled to a line-scanning generator 21 and a field-scanning generator 22 through an intersynchronizing-signal separator 20. The output circuit of the generator 21 is coupled in a conventional manner to the line-scanning coil of the image-reproducing device 17 through a line-scanning amplifier 23 while the field-scanning generator 22, which may include suitable amplifiers, is connected to the field-scanning coil of the image-reproducing device. An output circuit of the line-scanning amplifier 23 is connected to input terminals 29, 29 of the control apparatus 19. Output terminals 28, 28 of the control apparatus 19 are connected to the input circutis of one or more of the stages of the units 12, 13 and 14 by a control circuit conductor 25 to supply an automatic-gain-control or A. G. C. effect to those stages. The units 10–23, inclusive, with the exception of the apparatus 19 which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13 wherein they are converted into intermediate-frequency signals. The latter, in turn, are selectively amplified in the intermediate-frequency amplifier 14 and are delivered to the detector 15. The modulation components of the signal are derived by the detector 15 and are applied to the video-frequency amplifier 16 wherein those components including the original unidirectional component are amplified and from which they are supplied to the input circuit of the image-reproducing device 17.

A control voltage, which is derived in a manner to be explained in detail subsequently by an automatic-gain-control supply in the unit 19, is applied by the control circuit conductor 25 as an automatic-amplification-control bias to the gain-control circuits of units 12, 13 and 14 to maintain the signal input within a relatively narrow range for a wide range of received signal intensities. The unit 19 also selects the synchronizing signals from the other modulation components of the composite video-frequency signal applied thereto by the video-frequency amplifier 16 in a manner which is explained in detail in applicant's copending application Serial No. 175,191, filed July 21, 1950, and entitled "Control Apparatus for Television Receivers."

The line-synchronizing and field-synchronizing signals derived by the unit 19 are applied by the terminals 27, 27 to the intersynchronizing-signal separator 20 wherein they are separated from each other and are then supplied to individual ones of the generators 21 and 22 to synchronize the operation thereof. An electron beam is produced by the cathode-ray image-reproducing device 17 and the intensity of this beam is controlled in accordance with the video frequency and control voltages impressed on the brilliancy-control electrode thereof. Saw-tooth current waves are generated in the line-frequency and field-frequency generators 21 and 22, respectively. The output signal of the generator 21 is supplied to the line-scanning coil of unit 17 through the amplifier 23 while the output signal of generator 22 is supplied directly to the field-scanning coil of device 17 to produce the usual scanning fields, thereby to deflect the cathode-ray beam of device 17 in two directions normal to each other to trace a rectilinear scanning pattern on the screen of the tube and thereby reconstruct the translated picture.

The audio-frequency modulation components of the received signal are derived in a conventional manner by the sound-signal detector and amplifier 18 and are applied to the loudspeaker thereof and converted to sound.

*Description of automatic-control apparatus of Fig. 1*

Referring now more particularly to Fig. 1 of the drawings, the automatic-gain-control apparatus 19 for the television receiver includes an electron-discharge phase-comparison device such as a triode 30 which is normally maintained in a non-conductive condition in a manner to be described subsequently. The apparatus 19 also includes means comprising a circuit for applying to a first pair of the electrodes of the tube 30, specifically to the control electrode and the cathode thereof, a first signal of periodic-pulse wave form. In particular, this means is effective to apply to the foregoing electrodes the composite modulation or video-frequency signal derived by the detector, the amplitude of which signal may vary and which includes at least one type of synchronizing-signal components, namely the line-frequency components, and the original unidirectional component representative of light variations and which may include undesired random noise pulses at least some of which may have an amplitude greater than the amplitude of the synchronizing-signal components. This means comprises input terminals 26, 26 and the output circuit of the video-frequency amplifier 16 and also comprises a resistor 37 connected between the ungrounded one of the terminals just mentioned and the control electrode of the tube 30. As is well known, the output circuit of a video-frequency amplifier, such as unit 16, is primarily resistive and ordinarily has a resistance of about 5,000 ohms. The resistor 37 preferably has a resistance which is large relative to that of the output circuit of the video-frequency amplifier 16, for example about three times the value thereof. At the frequency of the line-synchronizing signal, the effective input impedance to the tube 30, which impedance also includes that of the output circuit of the video-frequency amplifier 16, is primarily resistive.

The apparatus 19 further includes means in the form of a first impedance or integrating network 32 which is responsive to an output signal of the device 30 during conductive intervals. The network 32 is connected between the cathode of the tube 30 and a fixed reference potential point or ground and comprises an energy-storage device in the form of a condenser 33 which is connected in parallel with a pair of series-connected resistors 34 and 35. This network preferably has a time constant which is at least several times the period of the line-synchronizing components applied to the input terminals 26, 26 of the unit 19.

The control apparatus 19 additionally includes means comprising a circuit for applying to a second pair of electrodes of the tube 30, specifically to the anode and the cathode thereof, a second signal of periodic-pulse wave form synchronous with the aforementioned first signal, individual pulses of the second signal having, however, a phase which may vary relative to the phase of corresponding individual pulses of the first signal and having an amplitude substantially unaffected by amplitude variations of the synchronizing-signal components. This means comprises an input circuit including the terminals 29, 29 which are coupled to an output circuit of the line-scanning amplifier 23 in the manner previously mentioned and to the tube 30 through a coupling condenser 39. A condenser 40 is connected between the anode of the tube 30 and ground and effectively constitutes the input impedance of the circuit. The terminal 29 connected to the condenser 39 is preferably coupled to a suitable point in the line-scanning amplifier such as to the anode of the amplifier tube where there is developed in a conventional manner during each line retrace interval a relatively high-amplitude short-duration impulse of positive polarity. The well-known characteristics such as the Q of the tuned circuits of the generator 21 and its amplifier 23 are such that the positive output pulses applied to the terminals 29, 29 have an amplitude which is substantially unaffected by amplitude variations or temporary loss of synchronizing-signal components applied to the terminals 26, 26 from the video-frequency amplifier 16.

The automatic-control apparatus 19 further includes a differentiating means or circuit coupled between the anode and the cathode of the tube 30, including a means in the form of a condenser 50 cross-coupling a pair of the electrodes of the tube 30, specifically the anode and the control electrode thereof. The condenser 50 is represented in broken-line construction and it may comprise in whole or in part the interelectrode capacitance between the anode and the cathode of the tube and also the inherent capacitance of the wiring and terminal elements connected to those electrodes. The differentiating means also includes the primarily resistive input impedance, comprising the resistor 37, associated with the control electrode-cathode input circuit of the tube. This differentiating means, which has parameters so proportioned as to provide a time constant having a value much less than that of the interval of individual ones of the line-synchronizing pulses, is effective to apply to a pair of electrodes of the tube 30, specifically to the control electrode and the cathode thereof, a control signal of periodic-pulse wave form comprising pulses of shorter and substantially constant duration synchronously related to the line-synchronizing pulses and of such polarity as to produce the aforesaid conductive intervals and for applying said control signal to a pair of said electrodes to develop at least one output signal from the device 19 substantially only during the application of the aforesaid control signal, whereby a control effect developed across the network 32 is substantially independent of variations of the relative phases of the line-synchronizing pulses and the individual pulses applied to the terminals 29, 29. The time constant of the differentiating means is selected to be sufficiently short so that the edges of the line-synchronizing pulses applied to the control electrode-cathode input circuit of the tube 30 are not undesirably rounded or degraded. Accordingly, the time constant of this differentiating means may have a value which is related to the duration of the interval between two successive ones of the line-synchronizing pulses and may be, for example, less than one-sixth of that interval.

The automatic-control apparatus 19 also includes a parallel-connected resistor 48 and a condenser 47 forming a second impedance network 45 which, like the network 32, is responsive to the space current or output signal of the tube 30 during conductive intervals thereof for deriving a control effect having a value which tends to vary in accordance with the relative phases of the line-synchronizing pulse and the pulses from the unit 23 but which is of opposite sense or polarity to that of the control effect derived across the network 32. One terminal of the network 45 is connected to the anode of the tube 30 through a resistor 46 while the other terminal thereof is connected to a point of fixed potential such as ground. The junction of the network 45 and the resistor 46 is connected to one of the automatic-gain-control output terminals 28, 28 of the unit 19. The network 45 is preferably proportioned to have a time constant at least several times the period of the line-synchronizing pulses. The operating potentials developed for application to the tube 30 are such that it is normally nonconductive.

In accordance with a feature of the invention described and claimed in applicant's copending application Serial No. 175,191, filed July 21, 1950, entitled "Control Apparatus for Television Receivers," the unit 19 includes a rectifier device such as a high-back impedance diode 42 and a load resistor 43 therefor coupled in series relation between the control electrode of the tube 30 and the junction of the cathode-load resistors 34 and 35 for deriving across the resistors 43 and 35 synchronizing-signal pulses which are substantially independent of the aforesaid undesired random pulses and which have an amplitude substantially independent of any amplitude variations of the video-frequency signal applied to the terminals 26, 26. The anode of the tube 42 is connected to the control electrode of the tube 30 and the cathode is connected to the terminal of resistor 43 remote from its junction with the network 32, the latter being effective to apply a suitable operating bias potential to the cathode of the tube 42 so that it is normally nonconductive. The cathode of the tube 42 is also connected to the high-potential one of the synchronizing-signal output terminals 27, 27.

*Operation of Fig. 1 Control apparatus*

In considering the operation of the automatic-gain-control apparatus 19, it will be assumed initially that the proper operating biases are developed across the networks 32 and 45 by a few cycles of operation of the apparatus and also that the tube 30 is normally nonconductive but is effective to conduct only during a portion of each line-synchronizing pulse, as will be made clear hereinafter. As previously mentioned, the composite video-frequency signal including the usual picture components, the line- and field-synchronizing signal components, and the unidirectional components is supplied by the output circuit of the direct-current video-frequency amplifier 16 to the terminals 26, 26 coupled to the control electrode-cathode input circuit of the tube 30. There is also applied to the anode-cathode input circuit of that tube by way of the terminals 29, 29 and the coupling condenser 39 the signal comprising periodic positive polarity gating pulses supplied by the line-scanning amplifier 23. The signals applied to the control electrode-cathode circuit and the anode-cathode circuit of the tube 30 have such polarity as conjointly tending to cause the tube to have conductive intervals.

Reference is now made to Fig. 2 of the drawings, wherein curve A represents a single gating pulse which is applied to the anode of the tube 30 while curve B represents a single line-synchronizing pulse applied to the control electrode thereof. The bias appearing across the network 32 is such that the conjoint action of these pulses is ineffective to render the tube 30 conductive. It will be noted that the pulse of curve A has a small negative portion which may be neglected while the positive polarity portion has both an amplitude and a duration greater than that of the pulse of curve B. As previously mentioned, the relative phases of the pulses applied to the control electrode and to the anode of the tube may vary. In particular, the phase of the gating pulses applied to the anode may vary due to oscillator drift and potential variations of the power supply and this phase variation may be represented by the relative positions of the pulses of curve A′ and curve B.

As stated hereinbefore, such phase variations occurring in prior gated automatic-gain-control apparatus, undesirably alter the duration of individual ones of the space-current pulses periodically flowing through the gated tube of the apparatus. These changes in duration alter the average value of the space-current flow of the tube and, in turn, alter the magnitude of the developed automatic-gain-control potential since the latter is related to the aforesaid average value. In order to provide a more accurate automatic-gain-control potential, however, the average value of the space-current flow should be related primarily to the amplitude of the line-synchronizing pulses applied to the gating tube of the apparatus. To this end, the differentiating means comprising the primarily resistive impedance of the control electrode-cathode input circuit of the tube and the condenser 50 is effective to derive, in the well-known manner, from the high-amplitude gating pulses such as that illustrated by curve A, a control signal comprising the first derivative thereof as represented by curve C. This derivative has a positive portion of relatively high amplitude and short duration and also a negative portion of low amplitude and a duration longer than that of the positive portion thereof.

At the control electrode of the tube 30 the first derivative represented by curve C is superimposed on the line-synchronizing pulse of curve B to produce the high-amplitude resultant pulse represented by curve D. The bias established by the cathode network 32 of the tube 30 is such that the tube is rendered conductive only when the pulse of curve D exceeds the cutoff level *d—d*. It will be seen from the intercepts of the resultant pulse of curve D with the cutoff level *d—d* of the tube 30, that the anode current of the tube, as represented by curve E flows for but a short interval of time with reference to the duration of the positive polarity portions of the gating pulse of curve A which appears on the anode of the tube 30. The trailing edge portion of the resultant pulse of curve D appearing just below the cutoff level *d—d* decreases quite abruptly as indicated, thus tending to drive the tube 30 sharply to anode-current cutoff.

However, when the phase of a gating pulse varies with respect to its corresponding line-synchronizing pulse so that the gating pulse corresponds to the pulse of curve A′, the first derivative thereof may be represented by the pulse of curve C′. The resultant pulse applied to the control electrode of the tube 30 has the wave form represented by the pulse of curve D′. It will be seen from the last-mentioned curve that the width of the pulse at the cutoff level is small and is substantially equal to the width of the corresponding portion of the pulse of curve D. Therefore, the anode-current pulse has the wave form represented by the curve E′ of Fig. 2 and, hence, a pulse duration substantially equal to the current pulse of curve E. Since the durations of individual anode-current pulses are substantially constant, despite relative phase variations between the gating pulses and the corresponding line-synchronizing pulses, the positive potential developed across the network 32, or a portion thereof such as between the junction of the resistors 34 and 35 and ground, is always substantially independent of the relative phases of those pulses.

A similar potential, having a value related to the aforesaid cathode potential but having a negative polarity at the junction of the resistors 46 and 48, is developed across the network 45 since the networks 32 and 45 are both in the same direct-current anode-cathode loop or circuit of the tube 30. The potential developed across the last-mentioned network for application to the output terminals 28, 28 is related to the average direct current drawn from the anode excitation source comprising the terminals 29, 29, and this potential, as will be made clear subsequently, constitutes an automatic-gain-control potential related to the peak value of the composite video-frequency signal applied to the terminals 26, 26. Hence, the potential just mentioned is proportional to the effective amplitude of the carrier component of the television signal intercepted by the antenna system 10, 11 of the receiver and is most effective for its designated purpose.

Considering further the action of the apparatus 19 on the signals applied to the terminals 26, 26 and 29, 29, the resistor 37 coupled between one of the terminals 26, 26 and the control electrode of the tube 30 is effective to produce some positive clipping of the peaks of the higher amplitude portions of any noise pulses having an amplitude greater than the synchronizing-signal pulses. The conjoint action on the tube 30 of the gating pulses, the line-synchronizing pulses and the short-duration pulses superimposed thereon is to establish a variable direct-current reference level of positive potential at the cathode of the tube 30, that is, across the network 32. This level is effectively determined by the amplitude of the line-synchronizing pulses. Thus, should the amplitude of the video-frequency signal and, hence, the line-synchronizing pulses, decrease for any reason such as atmospheric disturbances or fading which affects the received wave-signal intensity, the bias developed across the network decreases proportionately so that the average amplitude between the control electrode and the cathode of the tube 30 remains at a level which bears a substantially fixed relationship to the level corresponding to the level of the synchronizing-signal peaks applied to the control electrode of tube 30. Conversely, when the amplitude of the synchronizing-signal pulses increases, the potential appearing across the network 32 increases in proportion to the aforesaid amplitude increase. Consequently, the reference level or potential established at the cathode of the tube 30, or the potential across a portion of the network 32, varies in accordance with the peak amplitudes of the components of the signal applied to the terminals 26, 26. This, in turn, keeps the average amplitude of the potential between the control electrode and the cathode at a level which bears a substantially fixed relationship to the level corresponding to the level of the synchronizing-signal peaks applied to the control electrode of tube 30.

Potential changes corresponding to those appearing across the network 32 but of opposite polarity thereto are developed across the network 45. Since the time constant of the network 45 is long with reference to the interval between line-synchronizing pulses, an average potential related to the peak amplitude of the line-synchronizing signal components and, hence, the carrier amplitude, is developed across the network and constitutes an accurate and desirable automatic-gain-control potential.

Considering the circuit of the tube 30 from a somewhat different standpoint, the circuit may be regarded for direct-current conditions as being in the nature of a cathode-follower amplifier wherein the potential of the cathode follows that of the control electrode. Thus, the average potential of the cathode of the tube 30 bears a fixed relationship to the instantaneous potential appearing on the control electrode of that tube during the occurrence of a synchronizing-signal pulse. Expressed somewhat differently, the composite video-frequency signal and the derivative signal superimposed on the synchronizing pulses thereof and applied to the control electrode-cathode circuit of the tube 30 effectively act in series with the variable direct-current reference level established at the cathode of the tube 30 or across a selected portion of the network 32. Thus, the circuit of the tube 30 may be considered to constitute a clamping circuit which is effective to clamp the cathode or a selected point on the network 32 to a varying reference level. The significance of this feature will be made clear presently.

In the manner explained in detail in applicant's above-mentioned copending application, the diode 42 is effective to derive across the series combination of the resistors 43 and 35 for application by the synchronizing-signal output terminals 27, 27 to the unit 20 synchronizing-signal pulses having an approximately constant amplitude despite wide variations in the amplitude of the signal applied to the terminals 26, 26 and occasioned by fading and variations in the signal-translating characteristic of preceding units of the television receiver.

The unit 19 has a low susceptibility to undesired random pulses or noise, in particular to noise occurring during the intervals between line-synchronizing pulses. Since effectively short-duration positive pulses are applied to the control electrode and to the anode of the tube 30 to gate or key the tube into conduction, the anode-cathode path through the tube is conductive only for a very small percentage of the time and the resistor 37 so limits the current that can flow from the control electrode to the cathode due to stray noise pulses that the average value of this control electrode-cathode current is normally small in comparison with that of the anode-cathode current. Accordingly, random or noise impulses occurring between synchronizing pulses have an inappreciable effect on the operation of the tube 30 and also on the magnitude of the variable bias potentials developed across the networks 32 and 45. Consequently, the automatic-gain-control portion of the unit 19 constitutes a so-called "keyed automatic-gain-control system" which is characterized by its excellent noise immunity and relative freedom from airplane flutter type of fading. Noise impulses having an amplitude greater than the desired synchronizing pulses are initially reduced by grid-current limiting in the circuit including the resistor 37 and, due to the periodic conductivity of the tube 30 at the synchronizing-signal rate, the reference level developed at the junction of the resistors 34 and 35 is not appreciably affected by high-amplitude noise appearing in the signal applied to the terminals 26, 26 of the unit 19.

The apparatus 19 also has an inherent feature which tends to cause the average anode current flowing in the time-constant network 45 to be relatively independent of variations in the wave form of the gating pulses applied to the anode of tube 30. These variations may comprise changes in amplitude, slope, duration or phasing of the gating pulses. A stabilizing action occurs because of the relatively high-impedance integrating network in the cathode circuit of the tube 30, this network producing a degenerative effect whereby changes in the area of the wave form of individual anode-current pulses are compensated by small changes in the control electrode-cathode bias which tends to provide a more constant average-current flow in the impedance network 45.

The control apparatus 19 has utility in low-grain, intermediate-gain and high-gain television receivers and, in general, requires for the various applications networks 32 having different impedances. For example, in a high-grain receiver, that is, one which has sufficient sensitivity so that thermal noise is effective to produce a full video-frequency output signal, experience has indicated that it is possible to employ a cathode impedance network for the tube 30 which has a lower impedance than would be required in a low-grain and intermediate-gain receiver without impairing the performance of the high-gain receiver at usable signal levels.

While applicant does not intend to limit the invention to any specific circuit constants, the following circuit constants are given as illustrative of circuit elements which may be utilized in the circuit of Fig. 1:

| | |
|---|---|
| Resistor **34** | 47 kilohms. |
| Resistor **35** | 470 kilohms. |
| Resistor **37** | 15 kilohms. |
| Resistor **43** | 10 kilohms |
| Resistor **46** | 220 kilohms. |
| Resistor **48** | 100 kilohms (max.). |
| Resistive impedance of control electrode-cathode circuit of tube **30**. | 20 kilohms. |
| Condenser **33** | 0.22 microfarad. |
| Condenser **40** | 100 micromicrofarads. |
| Condenser **47** | 0.22 microfarad. |
| Condenser **50** | About 3 microfarads. |
| Tube **30** | Type 12AU7. |
| Tube **42** | Type 6AL5 (½ thereof). |
| Periodic potential applied to terminals **26**, **26**. | About 45 volts (peak-to-peak). |
| Peak periodic potential applied to anode of tube **30**. | About 350 volts. |
| Duration of potential applied to anode of tube **30**. | About 7½ microseconds. |

| | |
|---|---|
| Duration of synchronizing-signal-pulses applied to control electrode of tube 30. | About 5 microseconds. |
| Duration of positive portion of superimposed pulse measured at half amplitude. | About 2 microseconds. |

*Description and operation of Fig. 3 apparatus*

Referring now to Fig. 3 of the drawings, there is represented a circuit diagram of a modified form of control apparatus which is generally similar to that represented in Fig. 1. Accordingly, corresponding elements are designated by the same reference numerals. In the control apparatus of Fig. 3, no circuit is represented for deriving the synchronizing components from the composite video-frequency signal applied to the terminals 26, 26. A pentode 60 is employed to derive an automatic-gain-control potential across the network 45 in the anode circuit of the tube. A source of potential +*Sc* is connected to the screen electrode of the tube 60 through a resistor 61, and the tube is maintained normally nonconductive by a suitable positive bias developed on the cathode of the tube by a voltage divider comprising resistors 62 and 63 in series connected to a source indicated +B. In the Fig. 3 embodiment, a condenser 50 is connected between the anode of the tube 60 and the control electrode thereof since the interelectrode capacitance between those elements of a pentode is small. A condenser 64 which may comprise in whole or in part the control electrode-cathode capacitance of the tube supplemented by the inherent capacitance existing between the wiring and the terminal element exists between the control electrode and the cathode of the tube 60. It will be observed that the automatic-gain-control apparatus of Fig. 3 does not include an integrating network in its cathode circuit as does the apparatus of Fig. 1.

The operation of the Fig. 3 apparatus is somewhat similar to that of the Fig. 1 apparatus. The tube 60 is periodically rendered conductive for the brief intervals during which the high-amplitude portion of the resultant pulses on the control electrode of the tube coincide with the gating pulses applied to the anode of the tube. The automatic-gain-control potential developed across the network 45 is substantially independent of variations of the relative phases of the gating pulses and the synchronizing-signal pulses applied to the designated electrodes of the tube 60.

*Description and operation of Fig. 4 apparatus*

An additional modification of the control apparatus of the present invention is represented schematically in Fig. 4 of the drawings. This apparatus is quite similar to that represented in Fig. 3 and corresponding elements are designated by the same reference numerals. In place of the pentode of Fig. 3, a pentagrid tube 70 is employed in the Fig. 4 arrangement of the invention. The screen electrodes are interconnected and are coupled to a source of potential +*Sc* through the resistor 61. The condenser 50 is coupled between the anode and the outer control electrode, this electrode also being connected to the cathode through a resistor 71 and to ground through a resistor 72. The positive bias applied to the cathode of the tube from the source +B is such that the tube is normally nonconductive but periodically conducts during intervals in which the high-amplitude portions of the resultant pulses on the inner control electrode coincide with portions of the gating pulses on the anode of the tube 70. The time-constant network which determines the wave form of the pulse coupled to the outer control electrode from the pulse applied to the anode of the tube is determined effectively by the values of the condenser 50 and the resistors 71 and 72, this time constant effectively being the product of the capacitance of the condenser 50 and the resistance of the parallel combination of resistors 71 and 72, the resistor 63 having a relatively low value.

The operation of the control apparatus of Fig. 4 is generally similar to that of the Fig. 3 circuit. Anode current flows only during the brief time intervals during which the short-duration positive amplitude portion of the first derivative appearing on the outer control electrode of the tube 70 coincides with the gating pulse supplied to the anode of that tube. The automatic-gain-control potential developed across the network 45 as a result of the flow of anode-current pulses in the tube 70 is substantially independent of variations of the relative phases of the gating pulses and the line-synchronizing pulses for reasons previously stated.

From the foregoing descriptions of the various embodiments of the invention, it will be apparent that an automatic-gain-control apparatus in accordance with the present invention is extremely simple in construction yet is capable of producing a gain-control effect which varies accurately with variations in the intensity of the received carrier-wave signal. It will also be clear that the automatic-gain-control apparatus of the present invention is effective to derive an automatic-gain-control potential which is substantially independent of small changes in the phase between the synchronizing-signal pulses and the gating pulses applied to the control tube thereof.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An automatic-gain-control apparatus for a television receiver comprising: a first circuit having a primarily resistive impedance for supplying synchronizing pulses having an amplitude which may vary; a second circuit for supplying periodic pulses having a frequency related to that of said synchronizing pulses but having a phase which may vary relative thereto; an electron-discharge phase-comparison device having input electrodes coupled to said first circuit, output electrodes coupled to said second circuit, a current-conductive path coupled between said output electrodes for passing current therebetween only during periods of coincidence between individual ones of said synchronizing pulses and said periodic pulses, an integrating network in said path having a time constant at least several times that of the period of said synchronizing pulses for deriving from said current a control effect having a value which tends to vary with said relative phases of said pulses, and means connected to said input electrodes for developing a bias normally maintaining said device in a nonconductive condition; and a condenser which is coupled between one of said output electrodes and one of said input electrodes and which is proportioned with said resistive impedance to constitute a differentiating circuit having a time constant much less than the interval of individual ones of said synchronizing pulses for deriving from said periodic pulses and effectively superimposing on said synchronizing pulses a control signal comprising pulses having maximum amplitude portions of substantially constant duration and of shorter durations than those of said synchronizing pulses to develop between said input electrodes resultant high-amplitude pulses which overcome said bias and effect said passage of said current only during said maximum amplitude portions, whereby said control effect is proportional to the average amplitude of said synchronizing pulses but is substantially independent of said variations of the relative phases of said periodic pulses and said synchronizing pulses.

2. An automatic-gain-control apparatus for a television receiver comprising: a first circuit having a primarily resistive impedance for supplying synchronizing pulses having an amplitude which may vary; a second circuit for supplying periodic pulses having a frequency related to that of said synchronizing pulses but having a phase which may vary relative thereto; an electron-discharge phase-comparison device having input electrodes coupled to said first circuit, output electrodes coupled to said second circuit, a current-conductive path coupled between said output electrodes for passing current therebetween only during periods of coincidence between individual ones of said synchronizing pulses and said periodic pulses, an integrating network in said path having a time constant at least several times that of the period of said synchronizing pulses for deriving from said current a control effect having a value which tends to vary with said relative phases of said pulses, and means connected to said input electrodes for developing a bias normally maintaining said device in a nonconductive condition; a resistor connected in said first circuit and responsive to an electron discharge which may be produced between said input electrodes by an applied signal for limiting the magnitude of the electron discharge therebetween; and a condenser which is coupled between one of said output electrodes and one of said input electrodes, and which is proportioned with said resistive impedance and said resistor to constitute a differentiating circuit having a time constant much less than the interval of individual ones of said synchronizing pulses for deriving from said periodic pulses and effectively superimposing on said synchronizing pulses a control signal comprising pulses having maximum amplitude portions of substantially constant durations and of shorter durations than those of said synchronizing pulses to develop between said input electrodes resultant high-amplitude pulses which overcome said bias and effect said passage of said current only during said maximum amplitude portions, whereby said control effect is proportional to the average amplitude of said synchronizing pulses but is substantially independent of said variations of the relative phases of said periodic pulses and said synchronizing pulses.

3. An automatic-gain-control apparatus for a television receiver comprising: a first circuit having a primarily resistive impedance for supplying synchronizing pulses having an amplitude which may vary; a second circuit for supplying periodic pulses having the same polarity as and a frequency related to that of said synchronizing pulses but having a phase which may vary relative thereto; an electron-discharge phase-comparison device having control electrode-cathode input electrodes coupled to said first circuit, anode-cathode output electrodes coupled to said second circuit, a current-conductive path coupled between said output electrodes for passing current therebetween only during periods of coincidence between individual ones of said synchronizing pulses and said periodic pulses, an integrating network in said path having a time constant at least several times that of the period of said synchronizing pulses for deriving from said current a control effect having a value which tends to vary with said relative phases of said pulses, and means connected to said input electrodes for developing a bias normally maintaining said device in a nonconductive condition; and a condenser coupled between said anode and said control electrode and which is proportioned with said resistive impedance to constitute a differentiating circuit having a time constant much less than the interval of individual ones of said synchronizing pulses for deriving from said periodic pulses and superimposing on said synchronizing pulses a control signal comprising pulses having maximum amplitude portions of substantially constant durations and of shorter durations than said synchronizing pulses to develop at said control electrodes resultant high-amplitude pulses which overcome said bias and effect said passage of said current only during said maximum amplitude portions, whereby said control effect is proportional to the average amplitude of said synchronizing pulses but is substantially independent of said variations of said relative phases of said periodic pulses and said synchronizing pulses.

4. An automatic-gain-control apparatus for a television receiver comprising: a first circuit having a primarily resistive impedance for supplying synchronizing pulses having an amplitude which may vary; a second circuit for supplying periodic pulses having the same polarity as and a frequency related to that of said synchronizing pulses but having a phase which may vary relative thereto; an electron-discharge phase-comparison device having control electrode-cathode input electrodes coupled to said first circuit, anode-cathode output electrodes coupled to said second circuit, a current-conductive path coupled between said output electrodes for passing current therebetween only during periods of coincidence between individual ones of said synchronizing pulses and said periodic pulses, an integrating network in said path having a time constant at least several times that of the period of said synchronizing pulses for deriving from said current a first control effect having a value which tends to vary with said relative phases of said pulses; an integrating network, connected as a cathode load for said device and including a point thereon remote from said cathode maintained at a fixed reference potential, having a time constant at least several times that of the period of said synchronizing pulses and responsive to cathode current for deriving a second control effect which dynamically biases said cathode sufficiently positive relative to said control electrode as normally to maintain said device in a nonconductive condition and which effect has a value that tends to vary with said relative phases of said pulses; and a condenser coupled between said anode and said control electrode and which is proportioned with said resistive impedance to constitute a differentiating circuit having a time constant much less than the interval of individual ones of said synchronizing pulses for deriving from said periodic pulses and superimposing on said synchronizing pulses a control signal comprising pulses having maximum amplitude portions of substantially constant durations and of shorter durations than said synchronizing pulses to develop at said control electrode resultant high-amplitude pulses which overcome said bias and effect said passage of said current only during said maximum amplitude portions, whereby said control effects are proportional to the average amplitude of said synchronizing pulses but are substantially independent of said variations of said relative phases of said periodic pulses and said synchronizing pulses.

5. An automatic-gain-control apparatus for a television receiver comprising: a first circuit for supplying synchronizing pulses having an amplitude which may vary; a second circuit for supplying periodic pulses having a frequency related to that of said synchronizing pulses but having a phase which may vary relative thereto; a phase-comparison device having a pair of electrodes coupled to said first circuit, a primarily resistive impedance coupled to said first pair of electrodes, a pair of electrodes coupled to said second circuit, means connected to said device for developing a bias normally maintaining said device in a nonconductive condition but permitting current conduction during periods of coincidence between individual ones of said synchronizing pulses and said periodic pulses, an integrating circuit in circuit with said device having a time constant at least several times that of the period of said synchronizing pulses for deriving from said current a control effect having a value which tends to vary with said relative phases of said pulses; and a condenser which is coupled to said device and said first and second circuits and which is proportioned with said resistive impedance to constitute a differentiating circuit having a time constant much less than the interval of individual ones of said synchronizing pulses for deriving from said periodic pulses and effectively superimposing on said synchronizing pulses a control signal comprising pulses having maximum amplitude portions of substantially constant durations and of shorter durations than those of said synchronizing pulses to develop resultant high amplitude pulses which overcome said bias and effect said passage of said current only during said maximum amplitude portions, whereby said control effect is proportional to the average amplitude of said synchronizing pulses but is substantially independent of said variations of the relative phases of said periodic pulses and said synchronizing pulses.

6. An automatic-gain-control apparatus for a television receiver comprising: a first circuit having a primarily resistive impedance for supplying line-synchronizing pulses having an amplitude which may vary; a second circuit for supplying periodic pulses having a frequency related to that of said synchronizing pulses but having a phase which may vary relative thereto; an electron-discharge phase-comparison device having control electrode-cathode input electrodes coupled to said first circuit and anode-cathode output electrodes coupled to said second circuit so that said synchronizing pulses are applied with positive polarity to said control electrode and said periodic pulses are applied with positive polarity to said anode electrode, a current-conductive path coupled between said output electrodes for passing current between said output electrodes only during periods of coincidence between individual ones of said synchronizing pulses and said periodic pulses, an integrating network in said path having a time constant at least several times the period of said synchronizing pulses for deriving from said current a control effect having a value which tends to vary with said relative phases of said pulses, and means connected to said input electrodes for developing a bias normally maintaining said device in a nonconductive condition; and a condenser coupled between said anode and said control electrode and which is proportioned with said resistive impedance to constitute a differentiating circuit having a time constant much less than the interval of individual ones of said synchronizing pulses for deriving from said periodic pulses and superimposing on said synchronizing pulses a control signal comprising pulses having maximum amplitude portions of substantially constant durations and of shorter durations than said synchronizing pulses to develop at said control electrode resultant higher amplitude pulses which overcome said bias and effect said passage of said current only during said maximum amplitude portions, whereby said control effect is proportional to the average amplitude of said synchronizing pulses but is substantially independent of said variations of said relative phases of said periodic pulses and said synchronizing pulses.

References Cited in the file of this patent

UNITED STATES PATENTS

| | | |
|---|---|---|
| 2,240,600 | Applegarth | May 6, 1941 |
| 2,538,519 | Holst | Jan. 16, 1951 |
| 2,559,038 | Bass | July 3, 1951 |
| 2,593,011 | Cotsworth | Apr. 15, 1952 |
| 2,609,443 | Avins | Sept. 2, 1952 |
| 2,632,802 | Vilkomerson et al. | Mar. 24, 1953 |
| 2,635,184 | Cotsworth | Apr. 14, 1953 |

FOREIGN PATENTS

| | | |
|---|---|---|
| 109,480 | Australia | Jan. 18, 1940 |
| 474,266 | Great Britain | Oct. 28, 1937 |
| 845,897 | France | Sept. 4, 1939 |

OTHER REFERENCES

Rider's Television Manual, vol. 4, Admiral TV, page 4–31, 32.